Dec. 30, 1947.  C. L. O'QUINN ET AL  2,433,477
PIPE EXTRACTOR
Filed Aug. 4, 1945  2 Sheets-Sheet 2

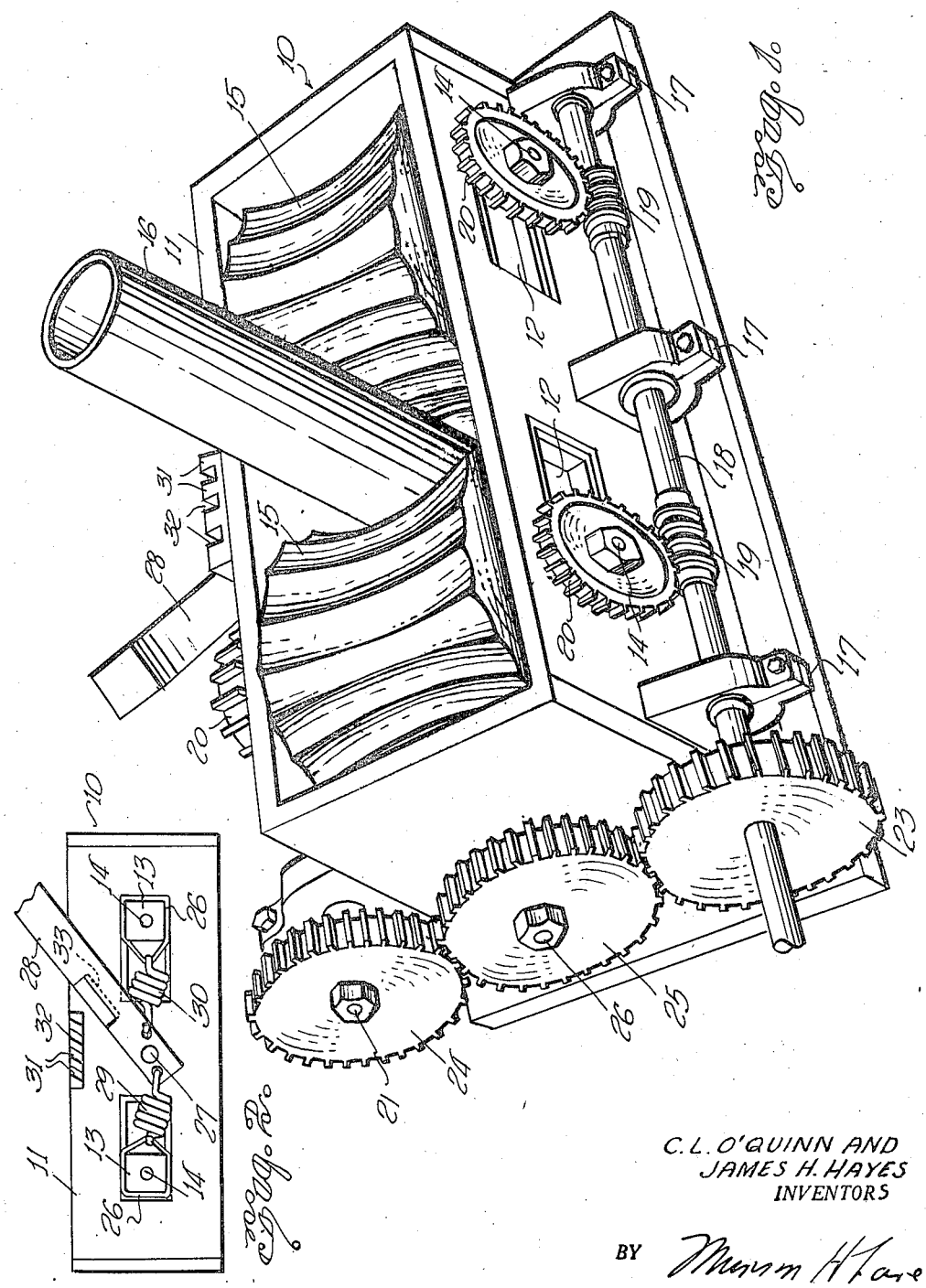
C. L. O'QUINN AND
JAMES H. HAYES
INVENTORS

C. L. O'QUINN AND
JAMES H. HAYES
INVENTORS

BY

Patented Dec. 30, 1947

2,433,477

UNITED STATES PATENT OFFICE 2,433,477

PIPE EXTRACTOR

C. L. O'Quinn and James H. Hayes, Miles, Tex.

Application August 4, 1945, Serial No. 608,932

1 Claim. (Cl. 254—29)

This invention relates to pipe extractors and more particularly to apparatus for extracting pipe and casing from shallow wells.

The principal object of the invention is to provide an apparatus consisting of an elongated frame or housing open at the top and bottom for the passage of pipe or tubing and on each side of the central section of said frame or housing is rotatably disposed a sheave whose periphery is circumferentially concaved and transversely grooved so as to grip the pipe passing between the sheaves, moreover, provision is made by which to drive the sheaves in counter directions to move the pipe longitudinally in either direction, combined with means for maintaining constant tension on the gripping sheaves in counter direction.

Broadly, the invention seeks to provide through a compact but sturdy gearing assembly a readily portable device for extracting pipe, especially pipe of small diameter from shallow wells and wherein the power required to operate the device in pulling the most obstinate pipe need not be excessive, by virtue of said gearing assembly.

With the foregoing objects as paramount,

Figure 1 is a perspective view of a pipe extracting apparatus constructed according to the present invention.

Figure 2 is a rear elevational view, greatly reduced in size.

Figure 3:
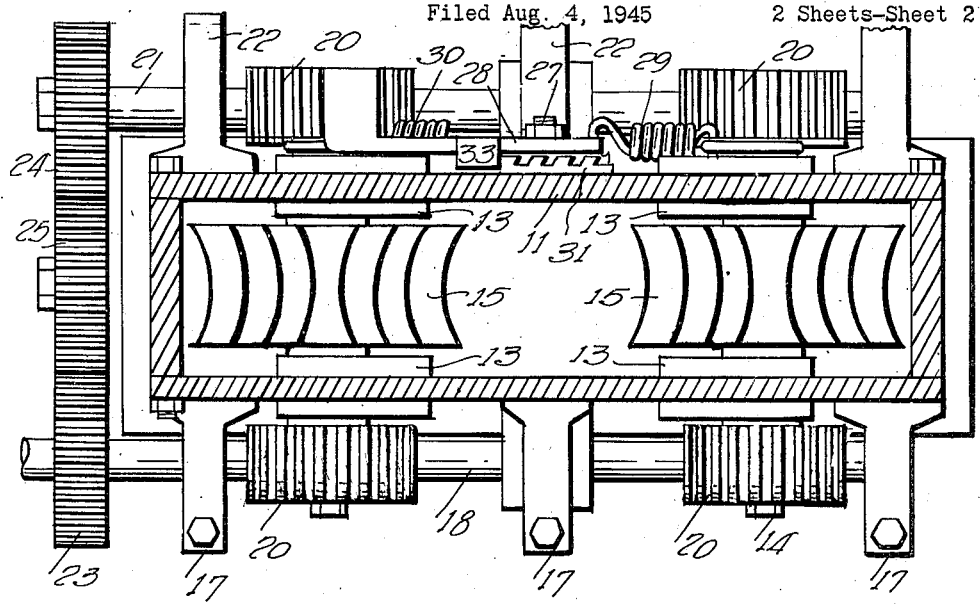
Figure 3 is a plan view.

Continuing with a more detailed description of the drawings, reference is primarily made to Figure 1 wherein 10 denotes a frame or housing composed of heavy gauge metal plates welded on or bolted together in the form shown. It may be mentioned at this point that a structural variation will be required in the housing where the pipe actuating elements or sheaves are propelled by dual drives over the type of unit whose sheaves have but a single drive. This feature, which will be more fully described later, is mentioned for the reason that the drawings show a unit having pipe actuating sheaves whose shafts are drawn from each end, that is to say, they are provided with a dual drive.

In the construction shown the front and rear walls 11 of the housing 10, each have seats 12 in which are disposed sliding bearing blocks 13. Journaled in these blocks are shafts 14, each of which carries a sheave 15 whose periphery is convexed and transversely grooved as shown in order that it will cooperate with the sheave on the companion shaft 14 in gripping a pipe 16 (Fig. 1) passing upwardly through the housing 10.

Mounted on the front plate 11 of the housing 10 is a series of bearings 17, suitably spaced apart to receive a shaft 18, which serves as the power shaft and extends across the front of the housing from end to end. This shaft is shown broken off in Figures 1, 3 and 4, but is constructed to accommodate a hand crank for manual operation and in the case of other applications of power, gears or sheaves may be employed through which to transmit power to the sheaves 15 by a motor.

The drive shaft 18 has mounted thereon in spaced relation worms 19 which mesh with worm gears 20 mounted on the ends of shafts 14. In this manner, torque applied to shaft 18 will be effective to operate pipe gripping sheaves 15, to actuate the pipe 16 therebetween.

It has been stated that in order to apply a driving force at each end of the shafts 14, a dual drive is provided. To accomplish this, the worms 19 and cooperating worm gears 20 described, are duplicated on the opposite wall 11 or rear of the housing and are mounted on a shaft 21, journaled in spaced apart bearings 22. The shaft 21 is driven from the worm or power shaft 18 through gears 23 and 24, mounted on shafts 18 and 21 respectively, and an intermediate gear 25, the latter being idle and mounted on a stub shaft 26, affixed to and extending outwardly from one end of the housing 10.

It is apparent from the foregoing that rotation imparted to the main drive shaft 18 will rotate the gripping sheaves 15 in counter directions through the worms and worm gears 19 and 20. Simultaneously, shaft 21 will be rotated at the same speed through gears 23, 24 and 25 to impart rotation to the opposite ends of sheave shafts 14 through worm gears 19 and worm 20.

As a tensioning means for the gripping sheaves 15, to hold them yieldably in relation to the work, an arrangement such as shown in Figure 2, in reduced scale, is provided. This arrangement consists of heavy wire loops 26, lying in recesses about the blocks 13, slidably disposed in the rectangular openings 12 of the housing wall 11. Pivoted at 27 intermediate the openings 12 is a lever 28. A coiled spring 29 of sturdy construction is connected to one of the wire loops 26 and to the lower end of lever 28 and another and similar spring 30 is connected to the opposite loop 26 and to the lever 28 at a point spaced above the pivotal point 27 of the lever.

By oscillating lever 28, it is apparent that the blocks 13 in which the sheave shafts 14 are journaled, will be moved in counter directions to similarly move the sheaves 15 with respect to a pipe section 16 therebetween. The springs 29 and 30 permit the blocks and consequently the sheaves 15 to yield to joints or other protuberances between pipe sections 16 as the latter are extracted from a well.

Welded or otherwise affixed along the upper edge of the rear wall 11 of the housing 10, adjacent the lever 22 is a stop 31, whose series of recesses 32 selectively receive a projection 33, affixed to or turned inwardly from an edge of the lever 28. This adjustable stop is advantageous in the extracting of pipe of different diameters and the gripping sheaves 15 are, in a measure, self-adjusting. If greater tension is required on the sheaves in one position of the lever 28, it is moved to another position on the stop to place the springs 29 and 30 under greater tension.

Figure 4:
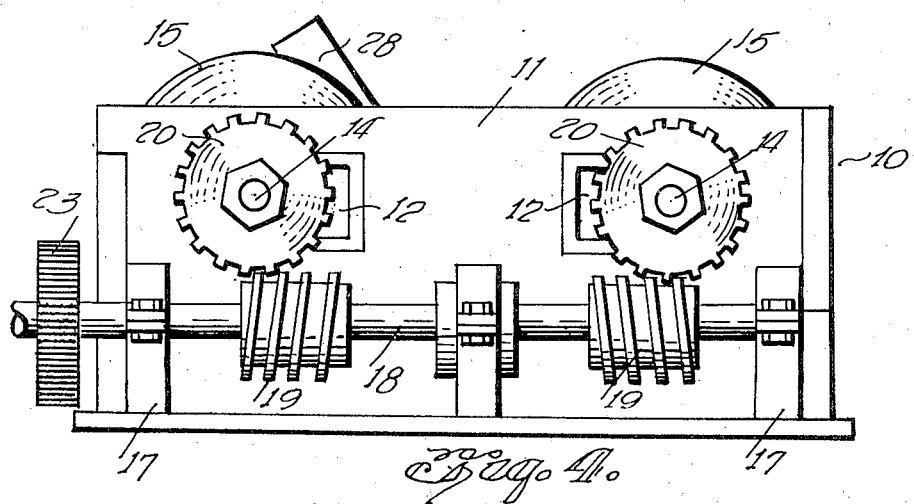
Figure 4 is a front elevational view.
Figure 5:
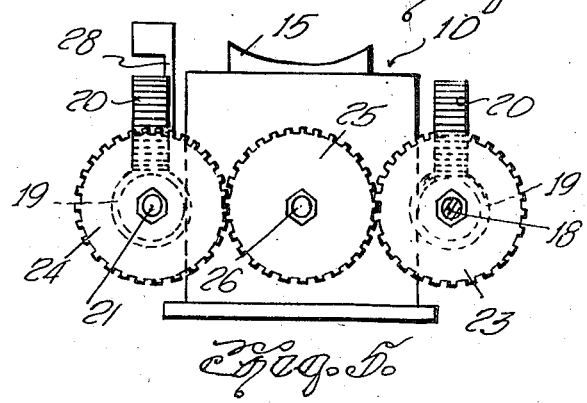
Figure 5 is an end view.

While Figures 1, 3 and 5 each show the dual sheave drive, the drawing elements consisting of the gears 23, 24 and 25 as well as the auxiliary shaft 21, and the worm gears carried thereby may be omitted when the tensioning arrangement just described is employed.

Inasmuch as the foregoing description explains the function of the parts individually in setting forth their relationship to each other, the operation of the apparatus as a whole is deemed to be self evident.

What is claimed is:

Apparatus of the character described including a housing, rotatable pipe gripping elements disposed in said housing and capable of transverse displacement relative to each other and the work, means holding said elements under tension, and means for driving said elements, said element tensioning means consisting of a lever pivoted intermediate its ends, springs attached to said lever opposing its pivot, each being connected to the axis of an element for exerting a converging force thereon, and means for locking said lever in adjusted positions.

C. L. O'QUINN.
JAMES H. HAYES.

REFERENCES CITED

The following references are of record in the file of this patent:

UNITED STATES PATENTS

| Number | Name | Date |
|---|---|---|
| 1,394,413 | Hobbs | Oct. 18, 1921 |
| 968,022 | Abbott et al. | Aug. 23, 1910 |
| 172,772 | Pryibil | Jan. 25, 1876 |
| 21,838 | Learitt | Oct. 19, 1858 |

FOREIGN PATENTS

| Number | Country | Date |
|---|---|---|
| 28,909 | France | Apr. 14, 1924 |